United States Patent
Engelhardt et al.

(10) Patent No.: US 6,567,212 B1
(45) Date of Patent: May 20, 2003

(54) VIBRATION DAMPING DEVICE FOR MICROSCOPES AND MICROSCOPE WITH A VIBRATION DAMPING DEVICE

(75) Inventors: Johann Engelhardt, Bad Schoenborn (DE); Rafael Storz, Bammental (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 224 days.

(21) Appl. No.: 09/639,592

(22) Filed: Aug. 16, 2000

(51) Int. Cl.⁷ ................................................ G02B 21/00
(52) U.S. Cl. ........................ 359/368; 359/391; 359/392; 359/393; 359/395
(58) Field of Search ................................ 359/368, 391, 359/392, 393, 395, 394, 398, 381, 656, 821, 827, 379, 382, 822, 823, 824

(56) References Cited

U.S. PATENT DOCUMENTS

| | | | |
|---|---|---|---|
| 4,168,881 A | 9/1979 | Rosenberger | 350/82 |
| 4,911,445 A * | 3/1990 | Ferrari et al. | 473/522 |
| 5,692,070 A * | 11/1997 | Kobayashi | 382/145 |
| 5,703,715 A * | 12/1997 | Gaul | 359/382 |
| 5,731,896 A | 3/1998 | Baumann et al. | 359/557 |
| 5,764,409 A | 6/1998 | Colvin | 359/382 |
| 5,870,222 A * | 2/1999 | Yamamoto et al. | 359/368 |
| 6,072,622 A * | 6/2000 | Biber | 359/368 |
| 6,337,767 B1 * | 1/2002 | Takeuchi | 359/368 |
| 6,392,795 B2 * | 5/2002 | Okada | 359/368 |
| 6,407,373 B1 * | 6/2002 | Dotan | 250/201.3 |

FOREIGN PATENT DOCUMENTS

JP          10148235 A     6/1998

* cited by examiner

Primary Examiner—Mohammad Sikder
(74) Attorney, Agent, or Firm—Simpson & Simpson, PLLC

(57) ABSTRACT

A Vibration damping device for a microscope comprises a housing. In the housing a foam rubber defining a cavity is formed which encloses a weight. The foam rubber has a plurality of interconnected pores. The housing is of the vibration damping device has in one embodiment a rectangular shape.

11 Claims, 3 Drawing Sheets

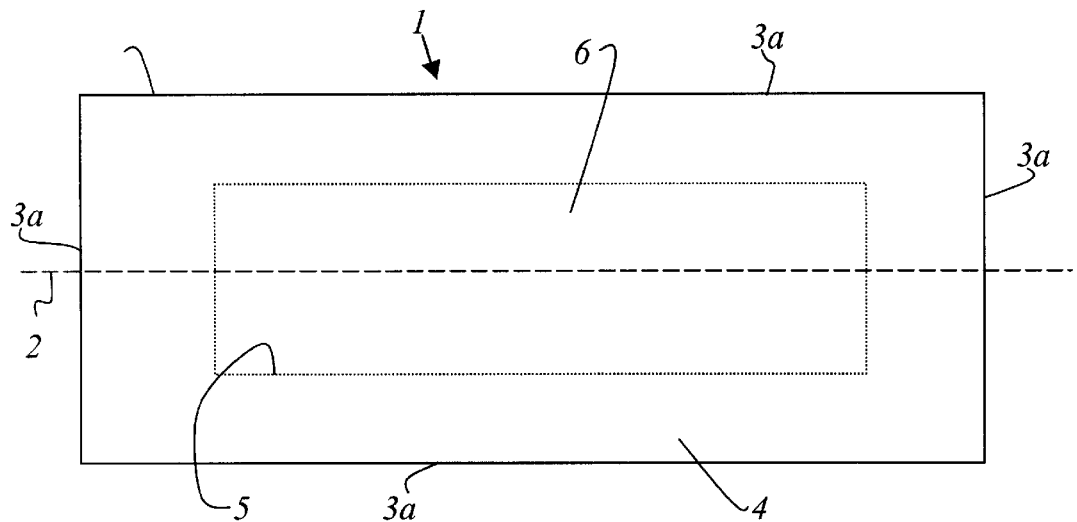
S-S  Fig. 1:
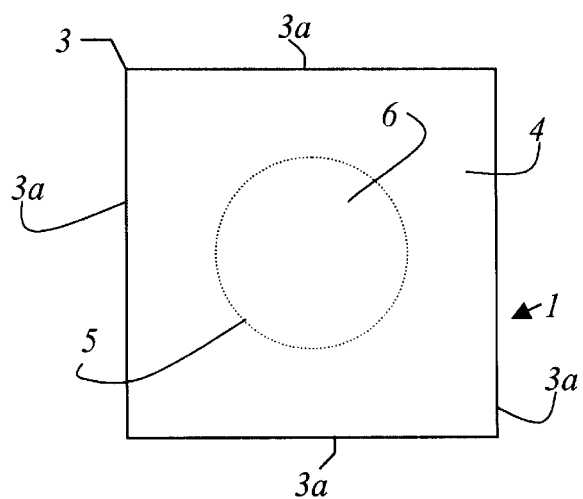
Fig. 2:

VIBRATION DAMPING DEVICE FOR MICROSCOPES AND MICROSCOPE WITH A VIBRATION DAMPING DEVICE

FIELD OF THE INVENTION

The present invention refers to a vibration damping device for microscopes especially the invention relates to a vibration damping device for confocal scanning microscopes and confocal laser scanning microscopes.

BACKGROUND OF THE INVENTION

It is vital for all the microscopic application that the distance between the objective and the object is constant during image capture. Vibration may cause a non-constant distance during image capture which may result in a reduced image quality. Vibration is a great inhibitor of microscope performance and it becomes a greater problem as the expected magnification and desired image quality increase, being particularly sensitive in the field of confocal laser scanning microscopy. At the threshold of the problem are vibrations which derive from the environment, such as footsteps, power applications, vehicles and other movements in the vicinity. It is assumed that suitable isolation means has been provided to reduce the effect of such vibrations on the microscope base or the table a microscope rests on. There remain, nonetheless, inherent vibrations, i.e., those deriving from devices built in the microscope itself, for example, electric motors, fans and other dynamics of microscope accessories.

The prior art provides several solution for the reduction of vibrations in microscope stands or in special elements of the whole microscope. U.S. Pat. 4,168,881 by Harold E. Rosenberger et. al., granted Sep. 25, 1979, discloses a construction of a microscope stand which reduces vibration effects. Here the objective mount is isolated from the superstructure. The microscope stage is mounted upon the pillar by means chosen to lend the stage a large measure of the pillar's rigidity. The stage has a relatively wide, vertical span of mounting bearings in contact with the pillar and the interface is relatively low on the pillar. The objective lens is also mounted in rigid relation to the pillar, by a strong cantilever arm rising at a low angle from the pillar and stoutly and rigidly held on the pillar. The eyepiece lens, or other viewing apparatus, is mounted on an arm, also cantilevered from the pillar, which extends over and around the objective mounting arm but which does not touch it anywhere. When the microscopist, or a bystander, touches the eyepiece mounting arm or the superstructure, vibrations and deflections which he might thereby introduce are to a large extent absorbed by the eyepiece mounting arm before they can be transmitted to the pillar or through it to the objective or stage mounts An introduced complexity in structure enables the reduction of vibrations.

U.S. Pat. No. 5,764,409 by James B. Colvin, entitled: ELIMINATION OF VIBRATION BY VIBRATION COUPLING IN MICROSCOPY APPLICATIONS, granted Jun. 09, 1998 shows a base for the microscope being placed over an opening in the wafer sorter. A translational apparatus is attached to the base for lowering a charge coupled device camera into an opening in the wafer sorter. A compact housing containing microscope optics is coupled to the camera. A vibration reducing apparatus is coupled to the microscope optics for preventing movement of the camera relative to the chip.

U.S. Pat. No. 5,731,896 by Hans Baumann et. al. entitled: MICROSCOPE, granted Mar. 24, 1998 shows a microscope which has the optically imaging portion of its optical arrangement separated from the object to be observed. The microscope has at least one force exerting drive element for the compensation of vibrations acting on the optical arrangement from its surroundings in at least one direction perpendicular to the optical axis. The drive element is installed in or on the microscope. The elimination of vibrations requires complicated control electronics and increases the cost of a microscope.

An additional vibration preventing device for a microscope is disclosed in the JP-Patent Application JP10148235. The disclosed device generates a noise which supplies an acoustic wave of reverse phase to this noise, which is for example generated in the sample chamber. The two kinds of sounds are negated each other. Vibration is remarkably reduced. Again, the system requires a complicated set-up to achieve the elimination of the vibrations.

SUMMARY OF THE INVENTION

It is therefore the object of the present invention to provide means which effectively reduce the inherent vibrations of a microscope.

The aforesaid object is achieved by vibration damping device for a microscope comprising a piece of foam rubber and a weight attached to said piece of foam rubber.

It is an other object of the invention to provide a microscope which allows, despite the inherent vibrations of the microscope, the capturing of high quality images This object is achieved by a microscope comprising a stand, at least one focusing device movably mounted to the stand, and a vibration damping device attached to at least one focusing device.

What has been recognized according to the present invention is firstly that by mechanically coupling the vibration damping device to a movable part of a microscope, the inherent vibrations and vibrations induced by external sources are reduced efficiently. The external sources for example are: air condition, fans used for external electronic devices, airplanes, vibrations of the building etc. The inherent vibrations arouse from electromotors and/or mechanical gears mounted in the stand of the microscope. The stage and/or the objective is moved by the electromotors along the optical axis in order to focus on one sample plane. Once the focus on the selected sample plane is achieved it is vital for the capturing of high quality images that the focus stays at this plane during the whole image capturing process. The vibration damping device is coupled to the stage and/or the objective to minimize the effect of the inherent vibrations on the constant focus during image capture.

It has proven advantageous that the housing of the vibration damping device is attached directly to the part of the microscope of which the vibrations should be reduced. To achieve a efficient vibration damping the vibration damping device need to be mechanically coupled to the part of the microscope which requires the damping. It is advantageous as well to attach the foam rubber with the mounted weight to the part of the microscope which requires damping. Consequently, the housing is not necessary to achieve the damping effect. It provides a better appearance of the whole vibration damping device and does not allow any manipulations of the vibration damping device.

The present invention is advantageous since with the vibration damping device a significant reduction of the vibrations is achieved. This enables that the image capture is done in one single plane of the object and is not disturbed by vibrations caused for example by the electromotor for moving the stage or the electromotor for moving the objective. The movement for the stage and the objective is along the optical axis.

BRIEF DESCRIPTION OF THE DRAWINGS

In conjunction with the explanation of the preferred exemplary embodiments with reference to the drawings, a general explanation is also given of preferred embodiments and developments of the teaching. In the drawings:

FIG. 1 shows, in a schematic cross section along the longitudinal axis of the vibration damping device;

FIG. 2 shows, in a schematic cross section along an axis perpendicular to the longitudinal axis of the vibration damping device

DETAILED DESCRIPTION OF THE INVENTION

Figure 3:
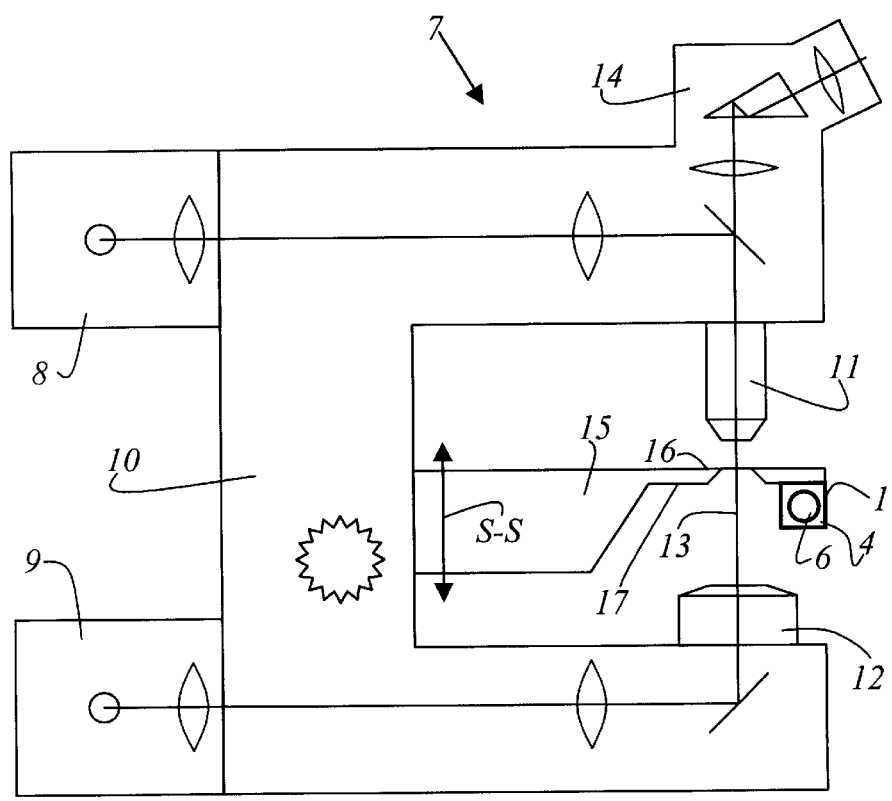
FIG. 3 shows a first embodiment of the mounting of the vibration damping device to a microscope.

FIGS. 1 and 2 each show a vibration damping 1 device of the present invention. The vibration damping device 1 (FIG. 1) defines a longitudinal axis 2. The vibration damping device 1 comprises a rectangular housing 3 which is defined by rigid walls 3a. A foam rubber 4 is attached to the inside of the walls 3a. The foam rubber 4 defines a cavity 5 which has in the present embodiment the form of a cylinder. The foam rubber 4 has numerous interconnected pores to let the air, enclosed in said foam rubber 4, freely move around under the exerted force and thereby dissipate energy in the foam rubber 4. A material for the foam rubber 4 is for example Neoprene™. The force is exerted by a weight 6 which is placed in the cavity 5. The cavity 5 loosely holds the weight 6 which is made from a high density material. In order to keep the costs down the material for the weight 6 is made of lead. As a second embodiment of the vibration damping device there is no need for a housing. The foam rubber 4 with an attached weight 6 are mounted directly to the device which requires damping.

FIG. 3 shows an upright microscope 7 with an reflection light source 8 and an transmission light source 9 both of which are attached to the microscope stand 10. The microscope 7 further comprises at least one objective 11 and a condensor 12 which are arranged in an optical axis 13. An eyepiece 14 is attached to the microscope stand 10 to provide the viewing or observation opportunities of a sample. The sample is paced on a stage 15. The stage 15, also facilitating focusing, is movable in the direction of the optical axis 13. The direction of movement is show by the double arrow S—S in FIG. 3. Since in most application the stage 15 is moved by an electro motor (not shown), which is mounted inside the stand 10, vibration are transmitted form the stand 10 to the stage 15. Not only the electro motor for the stage 15 also other devices mounted inside the stand are responsible for the vibrations of the stage 15. The stage defines an upper surface 16 adjacent to the objective 11 and lower surface 17 adjacent to the condensor 12. The vibration damping device 1 is mounted 1 mounted to the lower surface 17 of the stage 15. Furthermore, it is essential that the vibration damping device 1 is mounted to the stage without influencing the path of the optical axis 13.

Figure 4:
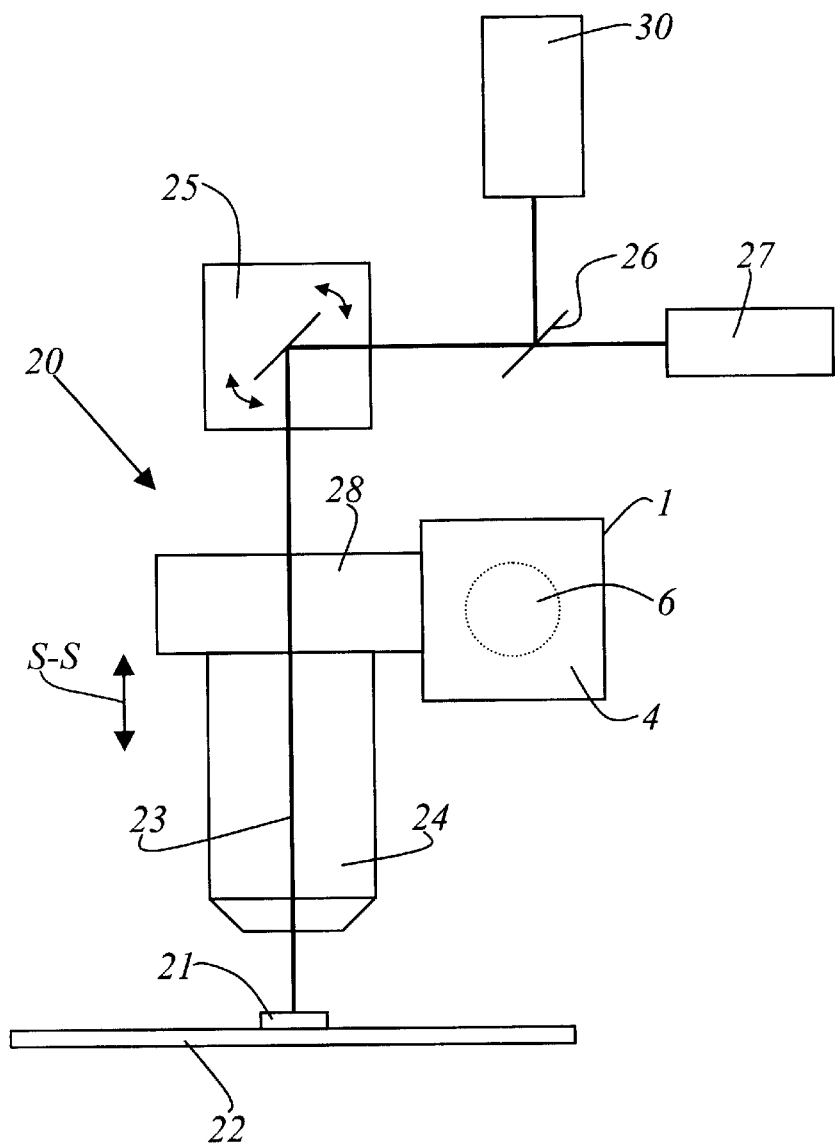
FIG. 4 shows a second embodiment of the mounting of the vibration damping device to a microscope.

FIG. 4 shows a schematic view of a confocal microscope 20. A laser 30 generates a fine light beam 23. A sample 21 is placed on a fixed stage 22. Similar features are designated with the same reference numeral. The sample 21 is illuminated with a fine light beam 23 which directed via a beam splitter 26 to a scanning device 25 and an objective 24. The objective 24 focuses the light onto the sample 21. A focusing device is as shown in the embodiment of FIG. 3 the stage 15 and in the embodiment of FIG. 4 the objective 24. The light beam 23 scans over or through an area of the sample 21. The scanning motion of the light beam 23 is initiated by the scanning device 25. Light returning form the sample 21 is transmitted by a beam splitter 26 to at least one detector 27. A translation of the focus of the illumination light is carried out by a translation of a revolver 28 on which the objectives 24 are arranged. The detailed design of the revolver is disclosed in the German Utility model 299 09 217.8 which is incorporated by reference herein. In order to avoid vibrations the vibration damping device 1 is directly mounted to the revolver 28. This causes an elimination or a remarkable reduction in the vibrations induced by the movement of the revolver 28.

The vibration damping device 1 of the present invention avoids the occurrence of unintentional movements of the sample and/or the objective. The unintentional movement would cause a remarkable reduction in image quality.

In conclusion, be it noted very particularly that the exemplary embodiment set forth above serves merely to describe the teaching claimed, but does not limit it to the exemplary embodiments.

| PARTS LIST | |
|---|---|
| 1 | vibration damping device |
| 2 | longitudinal axis |
| 3 | rectangular housing |
| 3a | rigid walls |
| 4 | foam rubber |
| 5 | cavity |
| 6 | weight |
| 7 | microscope |
| 8 | reflection light source |
| 9 | transmission light source |
| 10 | stand |
| 11 | objective |
| 12 | condensor |
| 13 | optical axis |
| 14 | mirror |
| 15 | stage |
| 16 | upper surface |
| 17 | lower surface |
| 20 | confocal microscope |
| 21 | sample |
| 22 | fixed stage |
| 23 | light beam |
| 24 | objective |
| 25 | scanning device |
| 26 | beam splitter |
| 27 | detector |
| 28 | revolver |
| 30 | laser |
| S-S | double arrow |

What is claimed is:

1. A microscope comprising a stand, a stage movably mounted to the stand, and a vibration damping device attached directly to the stage.

2. Microscope as defined in claim 1 wherein said stage is movable along an optical axis defined within said microscope.

3. Microscope as defined in claim 2 wherein the stage moved by an electromotor being mounted in the stand of the microscope.

4. A microscope comprising a stand, at least one focusing device movably mounted to the stand, and a vibration damping device attached to at least one focusing device, wherein said vibration damping device comprises a piece of foam rubber and a weight attached to said piece of foam rubber.

5. Microscope as defined in claim 4 comprising a housing and the foam rubber filling said housing wherein the foam rubber defining a cavity and the weight being placed within said cavity.

6. Microscope as defined in claim 5 wherein the housing is of a rectangular shape.

7. Microscope as defined in claim 6 wherein the housing made of tin.

8. Microscope as defined in claim 4 wherein the foam rubber has a plurality of interconnected pores.

9. Microscope as defined in claim 8 wherein the foam rubber is made of Neoprene™.

10. Microscope as defined in claim 4, wherein the weight is made from a high density material.

11. Microscope as defined in claim 10 wherein the material of the weight is lead.

* * * * *